(12) United States Patent
Alima

(10) Patent No.: US 9,379,364 B2
(45) Date of Patent: Jun. 28, 2016

(54) SPRING LOADED RECHARGEABLE BATTERY ASSEMBLY

(71) Applicant: Yariv Alima, Plantation, FL (US)

(72) Inventor: Yariv Alima, Plantation, FL (US)

(73) Assignee: Atmos Nation LLC, Davie, FL (US)

( * ) Notice: Subject to any disclaimer, the term of this patent is extended or adjusted under 35 U.S.C. 154(b) by 541 days.

(21) Appl. No.: 14/016,971

(22) Filed: Sep. 3, 2013

(65) Prior Publication Data

US 2014/0220398 A1   Aug. 7, 2014

Related U.S. Application Data

(60) Provisional application No. 61/761,015, filed on Feb. 5, 2013.

(51) Int. Cl.
*H01M 10/48* (2006.01)
*H01M 2/10* (2006.01)

(52) U.S. Cl.
CPC ............ *H01M 2/1055* (2013.01); *H01M 10/48* (2013.01)

(58) Field of Classification Search
None
See application file for complete search history.

(56) References Cited

U.S. PATENT DOCUMENTS

| 4,495,551 | A | † | 1/1985 | Foltz |
| 5,560,705 | A | † | 10/1996 | Shiau |
| 5,939,691 | A | † | 8/1999 | Shiau |
| 6,196,218 | B1 | † | 3/2001 | Voges |
| 8,328,788 | B2 | † | 12/2012 | Henley |
| 8,375,957 | B2 | † | 2/2013 | Hon |
| 8,734,189 | B2 | † | 5/2014 | Kim |
| 8,863,753 | B2 | † | 10/2014 | Li |
| 9,038,642 | B2 | † | 5/2015 | Liu |
| 9,060,548 | B2 | † | 6/2015 | Zheng |
| 2014/0373833 | A1 | * | 12/2014 | Liu ..................... A61M 11/042 128/202.21 |

* cited by examiner
† cited by third party

*Primary Examiner* — Tracy Dove

(57) ABSTRACT

A spring loaded rechargeable battery assembly is an apparatus that incorporates a particularly designed attachment mount in order to electrically engage a plurality of electronic cigarette/vaporizer components as part of a modular system. The apparatus utilizes an upper housing assembly, a retractable contact assembly, a battery control unit, a battery cell, a housing sleeve, and a lower housing assembly in order to function properly. Through the configuration of the upper housing assembly and the retractable contact plate, the spring loaded rechargeable battery assembly is able to form a preconfigured attachment mount that accommodates various fastener types but additionally includes an elastic pin system that engages vaporizer assembly terminals of various heights and widths.

11 Claims, 9 Drawing Sheets

SPRING LOADED RECHARGEABLE BATTERY ASSEMBLY

The current application claims a priority to the U.S. Provisional Patent application Ser. No. 61/761,015 filed on Feb. 5, 2013.

FIELD OF THE INVENTION

The present invention relates generally to a spring loaded rechargeable battery assembly. More specifically to spring loaded rechargeable battery assembly designed for use with a plurality electrically powered smoking device.

BACKGROUND OF THE INVENTION

It is regarded as common knowledge that electrically powered smoking devices can be utilized as a combustion free alternative to existing tobacco smoking devices. These electrically powered smoking devices exist in a plurality of configurations, whose selected construction is generally dependent on the level of portability. One of the most common variants is electronic cigarettes, as known as personal vaporizers. Electronic cigarette are portable vaporization devices that produces an inhalable aerosol that typically contains nicotine. Generally, electronic cigarettes/personal vaporizers comprise a mouth piece, an atomizer, an electrical source, and a reservoir containing a liquid compound. Of these components, the electrical source is required for any electronic cigarette/personal vaporizer to function. The electrical source is the energy source that powers all electrical components within the electronic cigarette/personal vaporizer. Typically, the electrical source is provided as a rechargeable battery designed to electrically engage the atomizer. To accomplish this engagement the rechargeable battery is provided as a part of an assembly that attaches to a complementary assembly comprising the mouth piece, the atomizer, and the reservoir, wherein the complementary assembly is hereinafter referred to as the vaporizer assembly. As a result of the specificity of this relationship, a plurality electronic cigarette/personal vaporizer systems with varying rechargeable battery assemblies exist.

While a rechargeable battery assembly utilized by an electronic cigarette/personal vaporizer system contains obvious overlapping similarities with the rechargeable battery assemblies of other electronic cigarette/personal vaporizer systems, a plurality of factors may exist that prevent cross system component functionality. These factors can be designed dissimilarities to prevent unintended component interaction, but could also be compatibility limitations due to system specific vaporizer assemblies, wherein system specific vaporizer assemblies share similarity in function but not in means of engaging with the rechargeable battery assembly. These system specific vaporizer assemblies typically vary in the threading and positioning of the threading for attaching to the rechargeable battery assembly. As a resulting of the difference I threading and positioning, the contact terminals may be slightly off and would be rendered incompatible with a non system specific rechargeable battery assembly. These compatibility limitations create a large amount of waste and needless redundancy that is not only harmful to the environment but additionally drains natural resources.

It is therefore the object of the present invention to provide a rechargeable battery assembly for use with an electronic cigarette/personal vaporizer system that contains functionality that permits it to couple with a plurality of electronic cigarette/personal vaporizer systems. The present invention accomplishes this through the use of a variable attachment mount for the rechargeable battery assembly that enables attachment to various vaporizer assemblies. The variable battery mount accommodates various fastener types but additionally includes an elastic pin system that engages vaporizer assembly terminals of various heights and widths.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
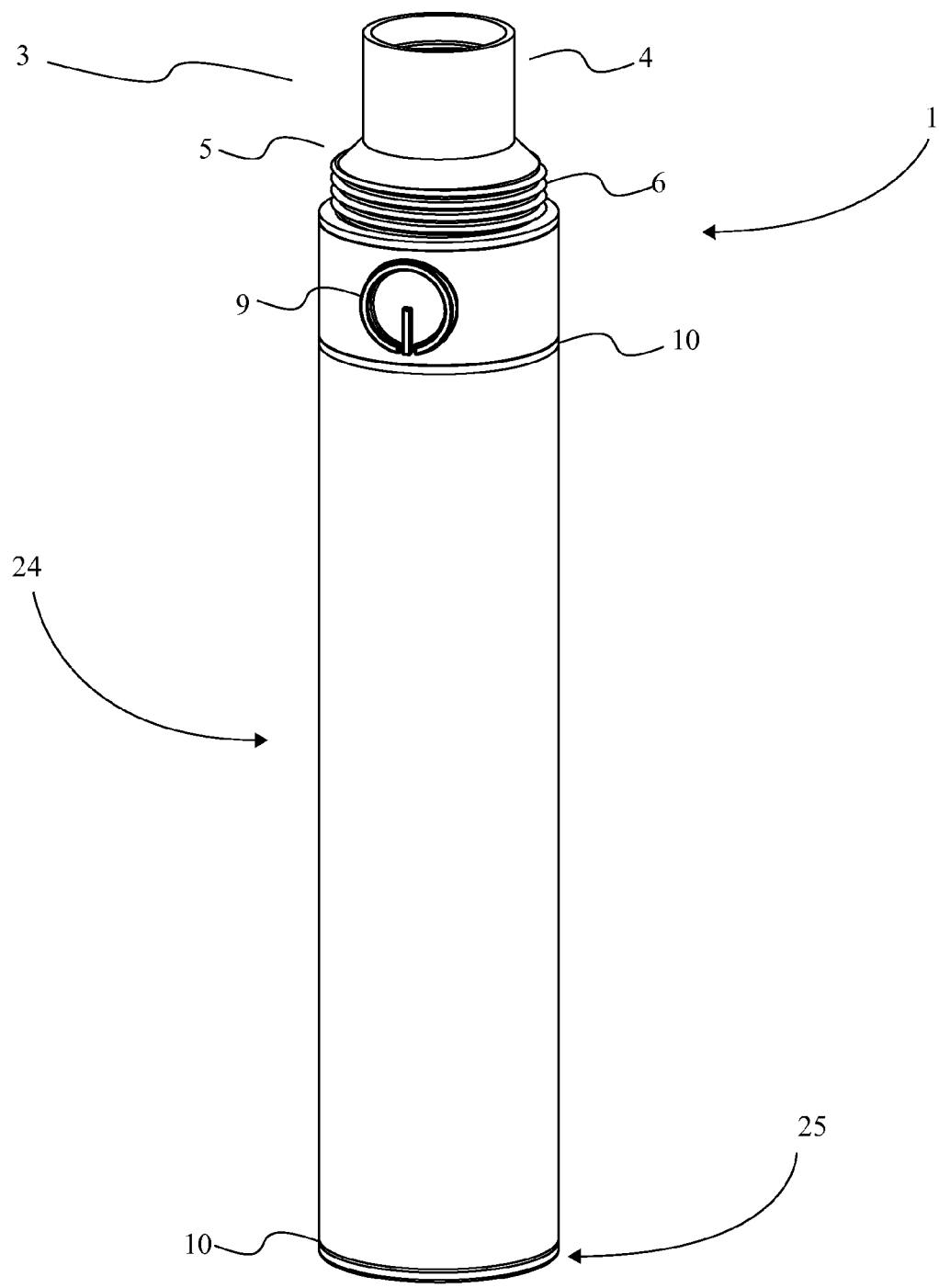
FIG. 1 is a frontal perspective view displaying the spring loaded rechargeable battery assembly as per the current embodiment of the present invention.
Figure 2:
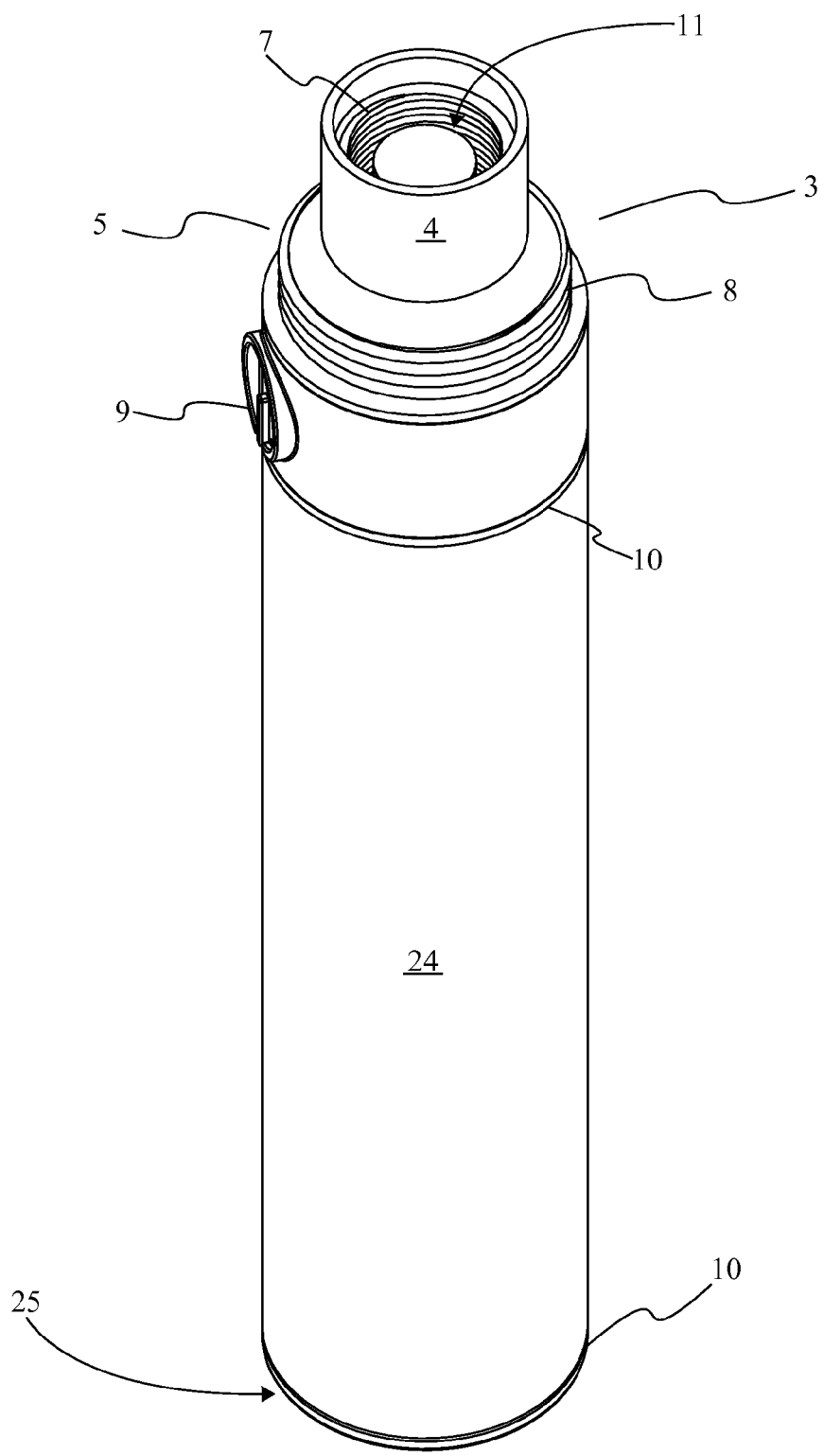
FIG. 2 is a top perspective view displaying the spring loaded rechargeable battery assembly as per the current embodiment of the present invention.
Figure 3:
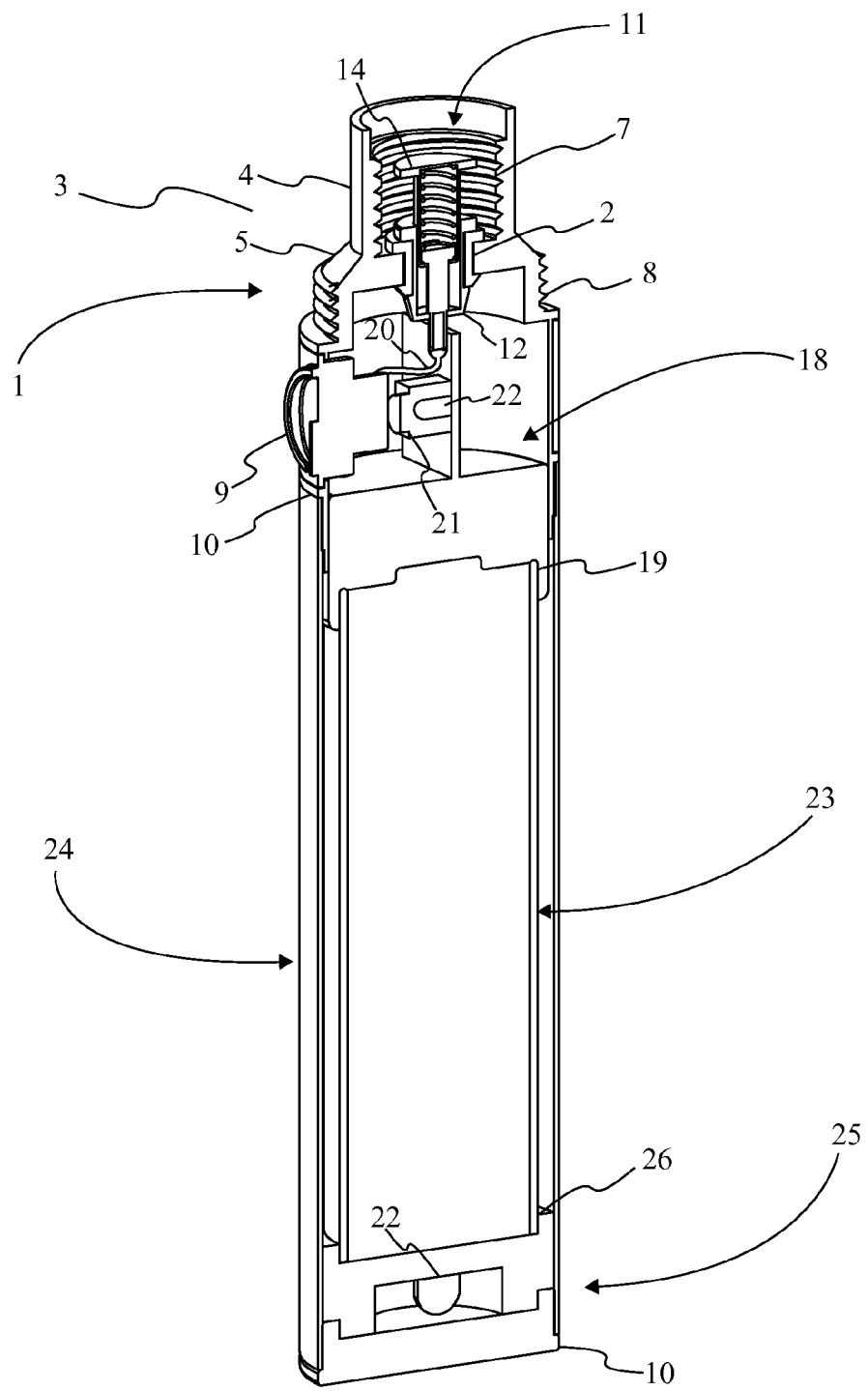
FIG. 3 is a cross sectional view displaying the internal component configuration of the spring loaded rechargeable battery assembly as per the current embodiment of the present invention.

Referencing FIG. 1-FIG. 3, the present invention is a spring loaded rechargeable battery assembly designed for use with a modular electronic cigarette/vaporizer system. The spring loaded rechargeable battery assembly is provided with the means to attach to a plurality of electronic cigarette/vaporizer components without requiring additional modifications. The current embodiment of the present invention comprises an upper housing assembly 1, a retractable contact assembly 11, a battery control unit 18, a rechargeable battery cell 23, a housing sleeve 24, and a lower housing assembly 25. The upper housing assembly 1 functions as the portion of the battery assembly that enables attachment to a plurality of electronic cigarette/vaporizer components. The retractable contact assembly 11 is a self adjusting component that enables an electrical coupling with the plurality of electronic cigarette/vaporizer components. The battery control unit 18 is provided as an electronic component that regulates certain function associated with the usage of the rechargeable battery cell 23. The rechargeable battery cell 23 is the electrical source that powers the plurality of electronic cigarette/vaporizer components that attach to the spring loaded rechargeable battery assembly. The housing sleeve 24 is provided as the exterior cover that surrounds the battery cell 23, and joins the upper housing assembly 1 to the lower housing assembly 25. The lower housing assembly 25 is provided as a complementary component that assists the upper housing assembly 1 and the housing sleeve 24 to securely encase the battery control unit 18 and the rechargeable battery cell 23. It should be noted that the rechargeable battery cell 23 is herein after referred to as the battery cell 23 unless otherwise noted.

Referencing FIG. 1-FIG. 3, in the current embodiment of the present invention, the upper housing assembly 1, the retractable contact assembly 11, the battery control unit 18, the battery cell 23, the housing sleeve 24, and the lower housing assembly 25 are aligned collinear to each other. The collinear alignment between the components of the spring loaded rechargeable battery assembly enables a compact design that improves the portability. The battery control unit 18, the battery cell 23, and the housing sleeve 24 are positioned between the upper housing assembly 1 and the lower housing assembly 25. The upper housing assembly 1, the housing sleeve 24, and the lower housing assembly 25 are the most visible portions of the spring loaded rechargeable battery assembly and provides the battery control unit 18 and the battery cell 23 with protection from accidental damage. The upper housing assembly 1 is positioned opposite the lower housing assembly 25 along the housing sleeve 24. The lower housing assembly 25 is positioned adjacent to the battery cell 23, while the upper housing assembly 1 is positioned adjacent to the battery control unit 18. The battery control unit 18 is found electrically engaged to the upper housing assembly 1, the retractable contact assembly 11, the lower housing assembly 25, and the battery cell 23. The battery control unit 18 is provided as a means of regulating the charge cycles and discharge cycles of the battery cell 23. The upper housing assembly 1 and the retractable contact assembly 11 cooperatively function as both the charge input terminals and the charge output terminal during a charge cycle and a discharge cycle respectively. The lower housing assembly 25 allows a closed circuit to be formed while additionally functioning as an indicator for the charge cycle and the discharge cycle.

Referencing FIG. 1-FIG. 4, the upper housing assembly 1, in the current embodiment of the present invention, comprises a contact mount 2, an attachment mount 3, a membrane button 9, and a sleeve mount 10. The contact mount 2 is the attachment point for the retractable contact assembly 11 to the upper housing assembly 1. The attachment mount 3 is the engagement point between the present invention and the plurality of electronic cigarette/vaporizer components. The membrane button 9 is the external component that allows a user to initiate a discharge cycle. The sleeve mount 10 of the upper housing assembly 1 is provides as the engagement between the upper housing assembly 1 and the housing sleeve 24. The sleeve mount 10 of the upper housing assembly 1 is found securely coupled to the battery sleeve, opposite the positioning of the lower housing assembly 25. The membrane button 9 is found peripherally positioned between the attachment mount 3 and the sleeve mount 10 of the upper housing assembly 1. The peripheral positioning allows the membrane button 9 but be positioned on the external surface of the upper housing assembly 1 in a manner that allows the utility. The membrane button 9 is found positioned coincident with the battery control unit 18. The membrane button 9 accomplishes this by partially traversing the upper housing assembly 1. The coincident positioning provides the membrane button 9 with an alignment that allows the membrane button 9 to engage the battery control unit 18 when activated by a user. The membrane button 9 accomplishes this by having a flexible construction that partly deforms when activated by a user allowing the membrane button 9 to temporarily engage the battery control unit 18.

Figure 4:
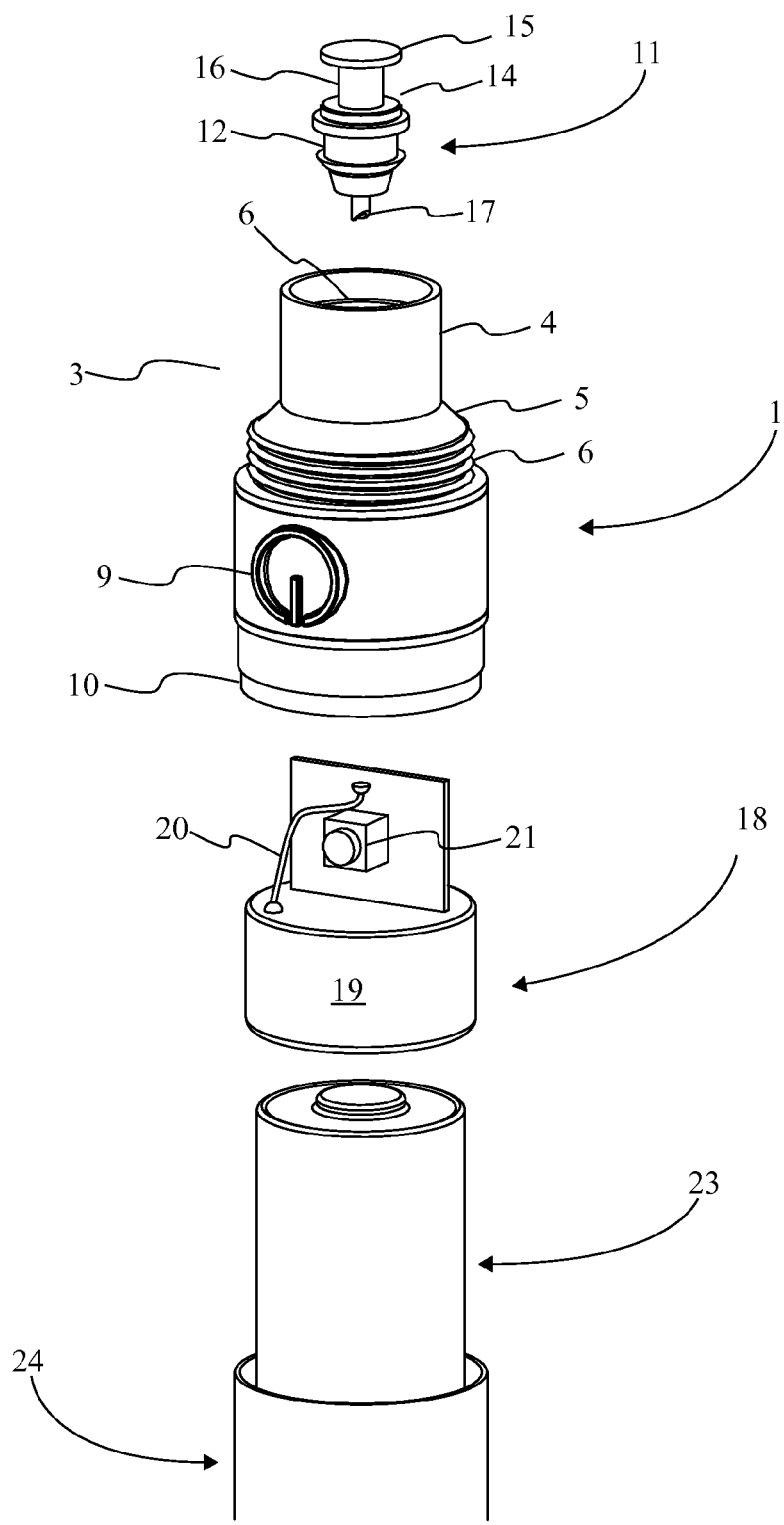
FIG. 4 is an expanded view displaying the component distribution between the upper housing assembly, the battery control unit, the retractable contact assembly, and the housing sleeve, as per the current embodiment of the present invention.

Referencing FIG. 3 and FIG. 4, the attachment mount 3 of the upper housing assembly 1, in the current embodiment of the present invention, comprises an alignment shaft 4, a tapered base 5, and a plurality of threaded attachment points 6. The alignment shaft 4 is provided as a means of ensuring a contact terminal 17 of the plurality of electronic cigarette/vaporizer components are properly aligned with the retractable contact assembly 11. The tapered base 5 is provided as structural component that can additionally function as an attachment point between the plurality of electronic cigarette/vaporizer components. The plurality of threaded attachment points 6 are provided as complementary fasteners particularly positioned in order to enable the attachment of the plurality of electronic cigarette/vaporizer components. The tapered base 5 is found positioned between the alignment shaft 4 and the membrane button 9. The contact mount 2 is found positioned within the alignment shaft 4. The contact mount 2 is positioned concentric to the alignment shaft 4 permitting the attachment of the retractable contact assembly 11 to be found centrally aligned within the alignment shaft 4. The plurality of threaded attachment points 6 are found positioned on both the tapered base 5 and the alignment shaft 4. The plurality of threaded attachment points 6 comprise a first threaded attachment point 7 and a second threaded attachment point 8. The first threaded attachment point 7 is found circumscribed by the alignment shaft 4, wherein the first threaded attachment point 7 is radially positioned on interior portion of the alignment shaft 4. The first threaded attachment point 7 is found positioned adjacent to the retractable contact assembly 11. The first threaded attachment point 7 provides a secure but detachable engagement for an electronic cigarette/vaporizer component. The first threaded attachment point 7 can function independently to detachably engage the electronic cigarette/vaporizer component but can additionally function complementary to the second threaded attachment point 8. The second threaded attachment point 8 is found permitrically positioned on the tapered base 5, wherein the perimetric positioning of the second threaded attachment point 8 partly surrounds the tapered base 5 near the membrane button 9. The second threaded attachment point 8 allows a larger electronic cigarette/vaporizer component to securely attach to the upper assembly housing assembly. Similarly the second threaded attachment point 8 can function independently from or cooperatively with the first threaded attachment point 7. it should be noted that although the first threaded attachment point 7 and the second threaded attachment point 8 are primarily described in a capacity that relates to the structural engagements between the present invention and a plurality of electronic cigarette/vaporizer components, that both the first threaded attachment point 7 and the second threaded attachment point 8 can function to as a grounding terminal for the electrical engagement between the retractable contact assembly 11 and the plurality of electronic cigarette/vaporizer components.

Figure 5:
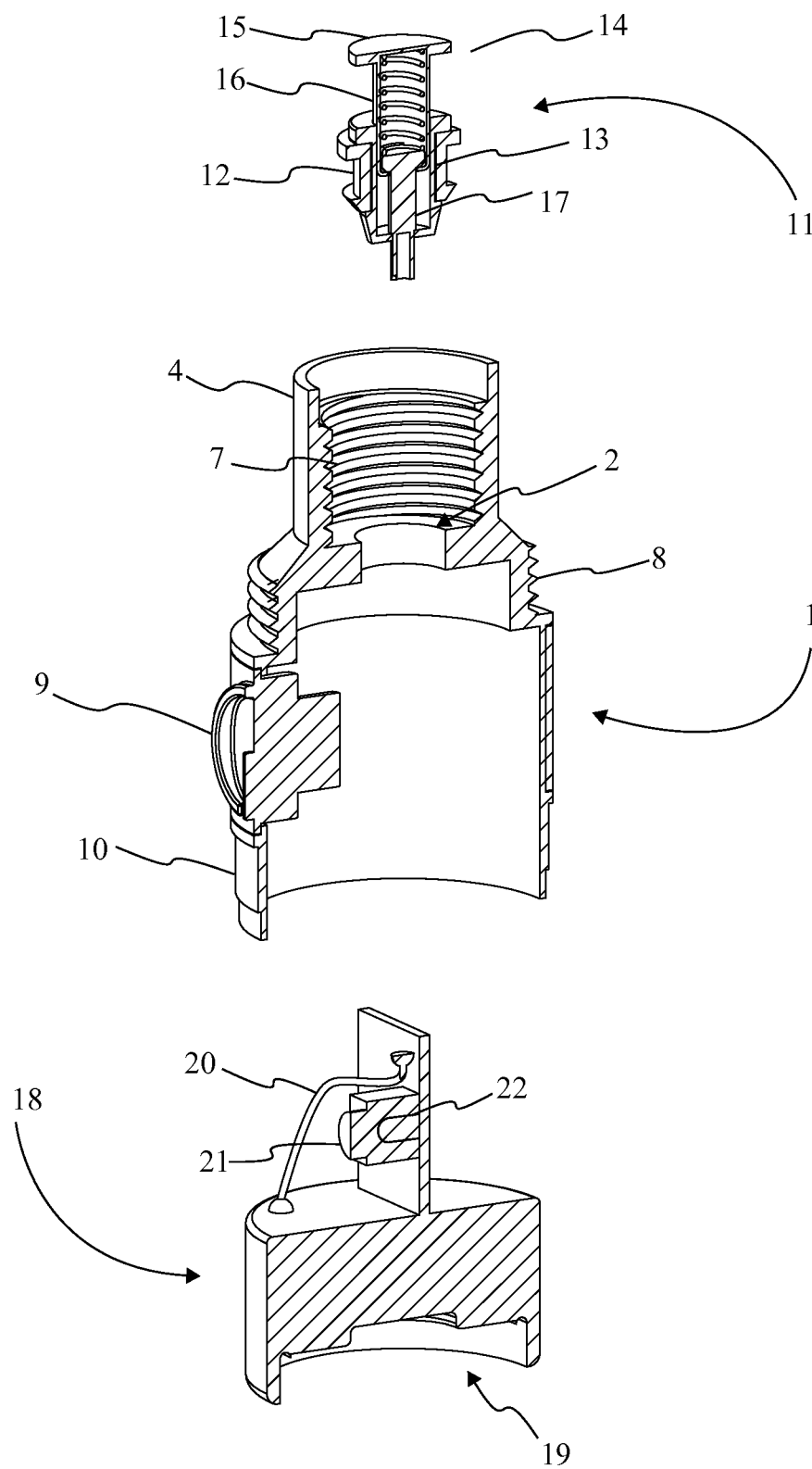
FIG. 5 is an expanded cross sectional view displaying the component distribution between the upper housing assembly, the battery control unit, the retractable contact assembly, and the housing sleeve, as per the current embodiment of the present invention.

Referencing FIG. 3-FIG. 5, the retractable contact assembly 11, in the current embodiment of the present invention comprises an insulated mount 12 and a contact pin assembly 14. The insulated mount 12 is an electrical and structural component that allows current to be directed through the contact pin assembly 14 while securing the contact pin assembly 14 to the upper housing. The contact pin assembly 14 is the self adjusting component that electrically engages the plurality of electronic cigarette/vaporizer components engaged to the upper housing assembly 1. The insulated mount 12 comprises a pin assembly shaft 13. The contact pin assembly 14 comprises a contact plate 15, an spring loaded shaft 16, and a contact terminal 17. The retractable contact assembly 11 is found partly traversing the contact mount 2 of the upper housing assembly 1. The insulated mount 12 is found securely coupled to the contact mount 2. The pin assembly shaft 13 is found traversing the contact mount 2. The contact pin assembly 14 is found retractably positioned within the pin assembly shaft 13, wherein the contact pin assembly 14 is engaged to the insulated mount 12 in a manner that allows the contact pin assembly 14 to elastically retract when needed in order to adjust to a plurality of electronic cigarette/vaporizer components. The spring loaded shaft 16 is found positioned between the contact plate 15 and the contact terminal 17. The spring loaded shaft 16 and the contact plate 15 are provided two part of the same component that is elastically coupled to the contact terminal 17. The contact terminal 17 is found partly traversing the pin assembly shaft 13. The first part of the contact terminal 17 is found secured to the pin assembly shaft 13 while the second part of the contact terminal 17 traverse the pin assembly shaft 13. The first part of the contact terminal 17 is secured to the pin assembly shaft 13 but contains a protrusion that is sleeved by the spring loaded shaft 16. The first part of the contact terminal 17 is found static to both the spring loaded shaft 16 and the contact plate 15. The contact plate 15 is found elastically retained to the contact terminal 17 by way of the spring loaded shaft 16. The elastically retained contact plate 15 allows the present invention to adjust to a plurality of electronic cigarette/vaporizer components that have differently shaped contact points. The contact plate 15 provides a larger surface area for engaging variably sized electrical terminals belonging to the plurality of electronic cigarette/vaporizer components. The terminal the second part of the contract terminal that traverses pin assembly shaft 13 protrudes into an interior chamber formed between the battery control unit 18 and the upper housing assembly 1. The second part of the contact terminal 17 is found electrically coupled to the contact terminal 17.

Referencing FIG. 3-FIG. 5, the battery control unit 18, in the current embodiment of the present invention, comprises an upper battery mount 19, at least one terminal coupler 20, and an activator switch 21. The upper battery mount 19 is the portion of the battery control unit 18 that engages the battery cell 23. The at least one terminal coupler 20 is the component of the battery control unit 18 that engages the contact terminal 17 of the retractable contact assembly 11. The activator switch 21 is the component that is indirectly engaged by a user initiating a discharge cycle, wherein a charge travels from the battery cell 23 through the upper battery mount 19 and through the at least one terminal coupler 20. The battery cell 23 is found positioned between the battery control unit 18 and the lower housing assembly 25, wherein the battery cell 23 is engaged to the lower housing and the battery control unit 18. The battery control unit 18 is electrically engaged to the battery cell 23 by way of the upper battery mount 19. The battery control unit 18 is found encircled by the housing sleeve 24 and the upper housing assembly 1. The upper battery mount 19 is found positioned between the activator switch 21 and the battery cell 23. The activator switch 21 is positioned collinear with the membrane button 9, wherein the collinear positioning provides a complementary arrangement to the positioning of the membrane button 9. The activator switch 21 comprises an indicator light 22. The indicator light 22 is oriented towards the membrane button 9, wherein the orientation of the indicator light 22 provides the membrane button 9 to light up when the activator switch 21 is engaged.

Referencing FIG. 1-FIG. 3, the lower housing assembly 25, in the current embodiment of the present invention comprises a sleeve mount 10, a lower battery mount 26, and an indicator light 22. The sleeve mount 10 of the lower housing assembly 25 is provided as a complementary engagement for the housing sleeve 24. The lower battery mount 26 is provided engagement point between the lower housing mount and the battery cell 23. The housing sleeve 24 is found secured engaged between the sleeve mount 10 of the upper housing assembly 1 and the sleeve mount 10 of the lower housing assembly 25. The secure engagement creates a chamber that is enclosed by the upper housing assembly 1, the housing sleeve 24, and the lower housing assembly 25, which contains the battery control unit 18 and the battery cell 23. The battery cell 23 is surrounded by the housing sleeve 24, wherein the battery control unit 18 and is mostly found surrounded by the upper housing assembly 1 while the battery cell 23 is almost entirely found surrounded by the housing sleeve 24. The lower battery mount 26 engages the lower portion of the battery cell 23 resulting in the lower battery mount 26 being encircled by the housing sleeve 24. The sleeve mount 10 of the lower housing sleeve 24 is a translucent plate that contains a radially positioned engagement region. The radially positioned engagement region permits the housing sleeve 24 to securely couple to the lower housing assembly 25. The indicator light 22 of the lower housing assembly 25 is electrically coupled the battery cell 23. The indicator light 22 of the lower housing assembly 25 is found positioned between the lower battery mount 26 and the sleeve mount 10 of the lower housing assembly 25. The indicator light 22 of the lower housing assembly 25 utilizes current from the battery cell 23 to light up. The indicator light 22 of the lower housing assembly 25 functions as an additional means of indicating to a user that the spring loaded rechargeable battery assembly is going through a charge cycle or a discharge cycle.

Referencing FIG. 6-FIG. 9, in the current embodiment of the present invention, the plurality of electronic cigarette/vaporizer components are an electrical component system that take part in a charge cycle or a discharge cycle. The plurality of electronic cigarette/vaporizer components can include component systems that discharge the spring loaded rechargeable battery assembly. These component systems include but are not limited to electrically power electronic cigarettes, electrically powered lights, electrically powered vaporizers, and any electrically powered component system that can engage the retractable contact assembly 11. The plurality of electronic cigarette/vaporizer components can include component systems that charge the spring loaded rechargeable battery assembly. These component systems include but are not limited to portable battery chargers and power adapters, as well as any electrical source with an adapter that can engage the retractable contact assembly 11.

Figure 6:
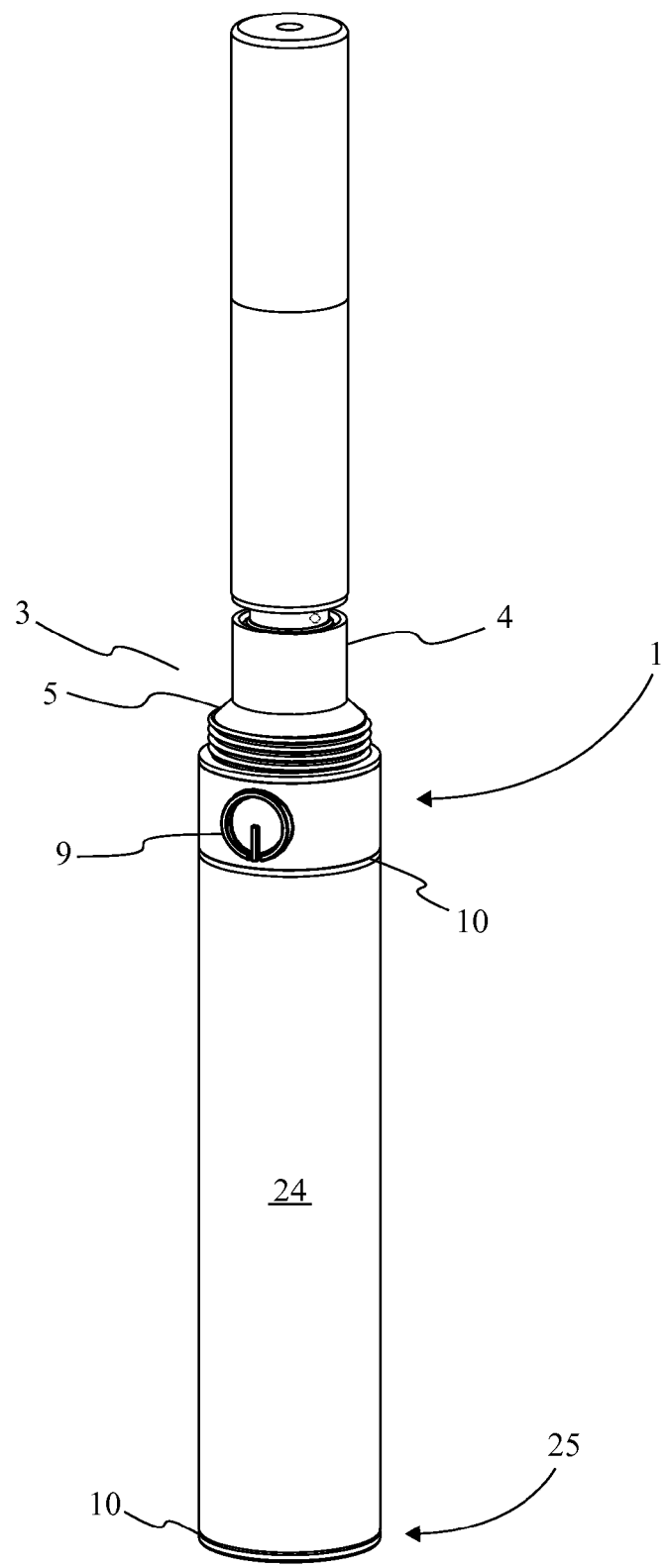
FIG. 6 is a perspective view displaying the rechargeable battery mount engaged with an electronic cigarette/vaporizer component as per the current embodiment of the present invention.
Figure 7:
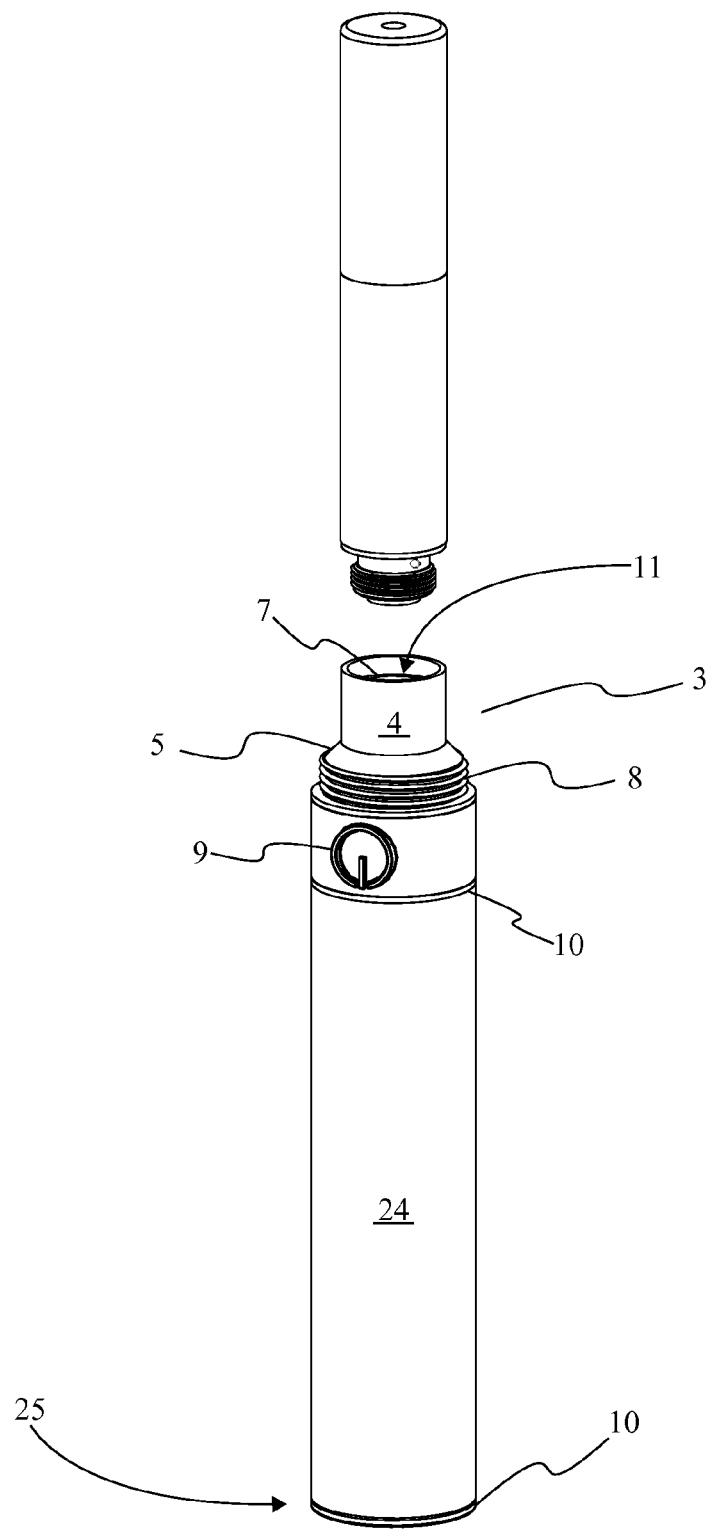
FIG. 7 is a perspective view displaying the rechargeable battery mount disengaged with the electronic cigarette/vaporizer component as per the current embodiment of the present invention.
Figure 8:
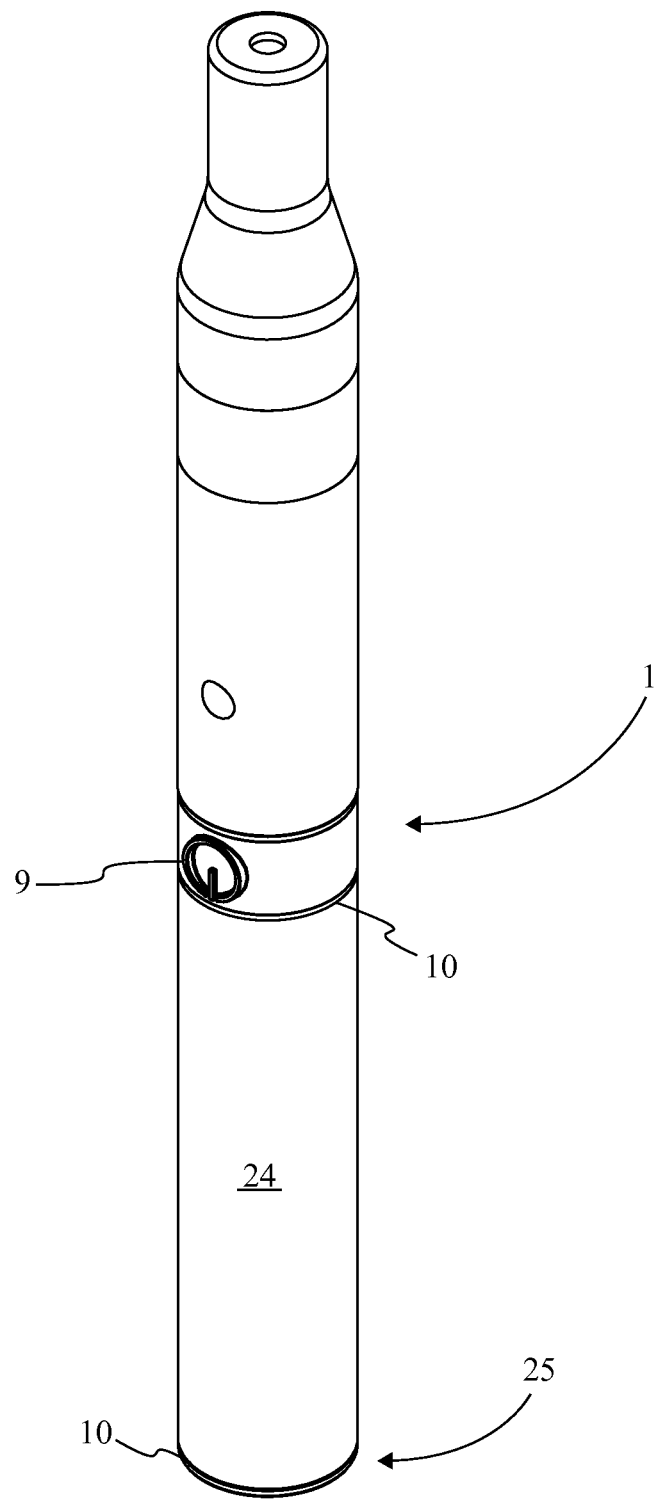
FIG. 8 is a perspective view displaying the rechargeable battery mount engaged with another electronic cigarette/vaporizer component as per the current embodiment of the present invention.
Figure 9:
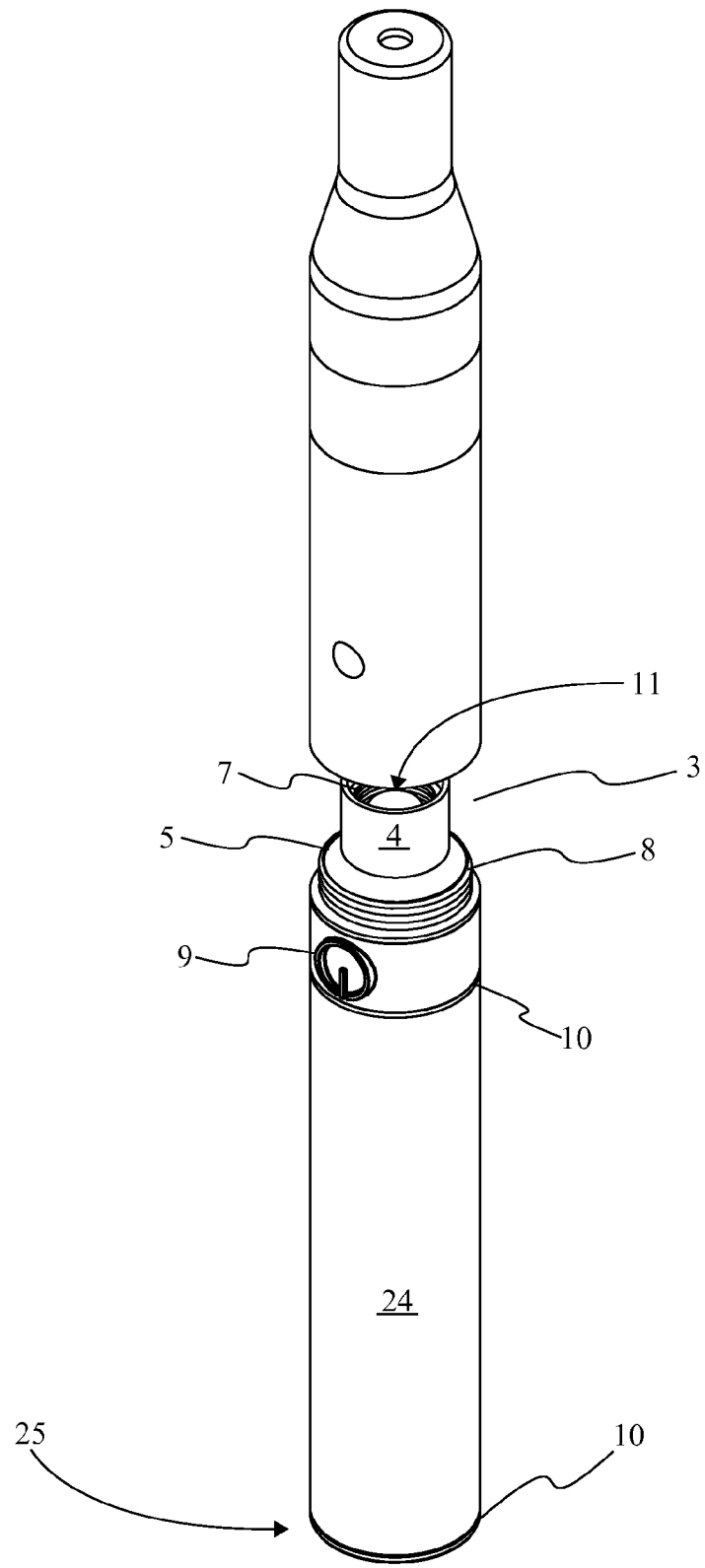
FIG. 9 is a perspective view displaying the rechargeable battery mount disengaged with the other electronic cigarette/vaporizer component as per the current embodiment of the present invention.

Referencing FIG. 6 and FIG. 7, in the current embodiment of the present invention, the retractable contact assembly 11 functions as an adjustable electrical contact with a plurality of electronic cigarette/vaporizer components. Through the adjustability provided by the retractable contact assembly 11, the spring loaded rechargeable battery assembly powers without restricting the airflow of the electronic vaporization device pictured in FIG. 6 and FIG. 7. The electronic vaporization device contains air inlets that are proximally positioned to their electrical contact. The spring loaded rechargeable battery assembly allows an electrical connection between the electrical contacts of the electronic vaporization device and the retractable contact assembly 11 without restricting air flow with the positioning of the alignment shaft 4.

In an embodiment of the present invention is a spring loaded rechargeable battery assembly designed for use with new and existing vaporizer assemblies and electronic cigarette/personal vaporizer systems. The present invention provides attachment compatibility that is not currently available between rechargeable battery assemblies and non system specific vaporizer assemblies. The spring loaded rechargeable battery assembly accomplishes this through the use of a variable connection/engagement mechanism integrated into the spring loaded rechargeable battery assembly. The rechargeable battery system with variable connection/engagement mechanism comprises, a rechargeable battery, an electrical control module, a plurality of visual indicators, an actuator input, a housing, and a variable connection/engagement mechanism. The rechargeable battery is the electrical source provided as an electrochemical cell designed to hold an electrical charge for the system. The electrical control module is a computerized component that regulates the charging and discharging of the rechargeable battery. The plurality of visual indicators are the user visible identifiers that provide the user with technical information regarding the charge state of the rechargeable battery. The actuator input is a user interaction point that allows the user to activate/deactivate the spring loaded rechargeable battery assembly. The housing is the structural component that retains the various components together during their operative phases. The variable connection/engagement mechanism is the attachment means between the spring loaded rechargeable battery assembly and a plurality of differing vaporizer assemblies.

In the present invention the rechargeable battery is the electrochemical cell that functions as the electrical source for the present invention. The rechargeable battery is retained within the housing and is electrically coupled with the electrical control module. The engagement between the electrical control module and the rechargeable battery provides the rechargeable battery with its functional aspects. While the current embodiment of the present invention does not provide specifications for the rechargeable battery, it should be understood that any rechargeable battery that provides sufficient current to enable the present invention to function can be utilized.

In an embodiment of the present invention the electrical control module is the computerized component that is responsible for control the manner in which the rechargeable battery charges and discharges. Through this interaction the electrical control module manages the recharge rate for the rechargeable battery and the discharge rate when activated by a user. To accomplish these functions the electrical control module is electrically engaged to the plurality of visual indicators, the actuator input, and the variable connection/engagement mechanism. The electrical control module is positioned within the housing, but can additionally be positioned adjacent to the variable connection/engagement mechanism. It should be noted that the electrical control module can be an integrated component that is positioned within the rechargeable battery but can additionally be provided as an integrated component that is found between the battery and the variable connection/engagement mechanism.

In an embodiment of the present invention the plurality of visual indicators provide a user with a means to determine the device specific information such as a charge capacity of the rechargeable battery, the operative state of the spring loaded rechargeable battery assembly where the state could be on or off, as well as if the battery is recharging or not. The plurality of visual indicators are found coupled to the electrical control module. The plurality of visual indicators can be positioned within the housing but can additionally be integrated with other components such as the actuator input. It should be noted that the plurality of visual indicators could be provided as two indicators lights positioned near one another or opposite to on the spring loaded rechargeable battery assembly, as well as a display screen showing detailed battery information or component details.

In an embodiment of the present invention the actuator input is a button positioned externally that enables a user to activate the present invention. The actuator input is coupled with electrical control module. The engagement with the electrical control module provides the actuator input with a means to indirectly activate and or deactivate the charging or discharging of the rechargeable battery. The actuator input can be integrated with the visual indicator. The actuator input can be provided with a visual indicator that informs users when they interact with the actuator input. In an embodiment of the invention the actuator input would be provided with facilitated access by a user, where facilitated access suggests an ergonomic position on the exterior surface of the housing. It should be noted that the integration of the actuator input and the visual indicator could be provided in a system where the actuator input and the visual indicator encompassed by a touch capable display screen.

In an embodiment of the present invention, the housing is the structural support that retains the rechargeable battery, the electrical control module, the actuator input, the plurality of visual indicators, and the variable connection/engagement mechanism. In an embodiment of the invention the housing is cylindrical in shape and retains the rechargeable battery within its interior chamber. The housing has a lateral wall that functions as the most visible and manipulated surface. The lateral wall functions as an optimal location for the position of the actuator input. The lateral wall is positioned between a housing base and the variable connection/engagement mechanism. In an embodiment of the invention the housing base provides little functionality aside from retaining the internal components within the housing, but in additional embodiments the housing base can function as the location of an inductive charging port. Furthermore, the housing can be provided with shaped features that enable the spring loaded rechargeable battery assembly to provide ergonomic features.

In an embodiment of the present invention the variable connection/engagement mechanism is provided as the means to couple the spring loaded rechargeable battery assembly with a plurality of vaporizer assemblies. The variable connection/engagement mechanism allows the spring loaded rechargeable battery assembly to couple with vaporizer assemblies that share common component distributions, where the common component distribution contains a threaded cylinder sleeve positioned around a concentrically positioned electrical contact. These components and their distribution are complementary to the variable connection/engagement mechanism's plurality of threaded bases and a concentrically positioned elastic terminal pin. In the present invention the plurality of threaded bases are provided to engage the threaded cylinder sleeve of vaporized assemblies, the plurality of threaded bases are positioned concentrically to one another but are sufficiently spaced apart to reduce unwanted interactions. This spacing of the threaded bases can create variable positioning to the concentrically positioned electrical contact of the vaporizer assembly. Through the use of the elastic terminal pin, the present invention can retain an electrical connection with the concentrically positioned electrical contact regardless of the vaporizer assembly. While the electrical connections are not explicitly described with respect to the positive terminal and negative terminal, it should be noted that the terminal arrangement is provided in a manner that optimally suits the functionality of the variable connection/engagement mechanism.

In an embodiment of the present invention the variable connection/engagement mechanism is described as the means to connect with a vaporizer assembly. While the engagement with the vaporizer assembly is understood as the preferred engagement it should be noted that the variable connection/engagement mechanism is also used to couple with the spring loaded rechargeable battery assembly with a charging port, where the charging port could potentially include similar distribution to the vaporizer assembly. Furthermore, it should be noted that the present invention could additionally be provided for use with any component that utilizes similar arrangement to the above described terminal positioning.

Although the invention has been explained in relation to its preferred embodiment, it is to be understood that many other possible modifications and variations can be made without departing from the spirit and scope of the invention as hereinafter claimed.

What is claimed is:

1. A spring loaded rechargeable battery assembly comprises:
   an upper housing assembly;
   a retractable contact assembly;
   a battery control unit;
   a rechargeable battery cell;
   a housing sleeve;
   a lower housing assembly;
   the upper housing assembly comprises a contact mount, an attachment mount, a membrane button, and a sleeve mount, wherein the membrane button is constructed of a translucent material;
   the retractable contact assembly comprises an insulated mount and a contact pin assembly;
   the battery control unit comprises an upper battery mount, a least one terminal coupler, and an activator switch;
   the lower housing assembly comprises a sleeve mount, a lower battery mount, and an indicator light, wherein the sleeve mount of the lower housing assembly is constructed of a translucent material;
   the attachment mount comprises an alignment shaft, a tapered base, and a plurality of threaded attachment points;
   the insulated mount comprises a pin assembly shaft;
   the contact pin assembly comprises a contact plate, an spring loaded shaft, and a contact terminal;
   the activator switch comprises an indicator light;
   the upper housing assembly, the retractable contact assembly, the battery control unit, the battery cell, the housing sleeve, and the lower housing being aligned collinear to each other;
   the battery control unit, the battery cell, and the housing sleeve being positioned between the upper housing assembly and the lower housing assembly; and
   the battery control unit being electrically engaged with the upper housing assembly, the retractable pin assembly, the lower housing assembly, and the battery cell.

2. The spring loaded rechargeable battery assembly as claimed in claim 1 comprises:
   the sleeve mount of the upper housing assembly being securely coupled to the battery sleeve opposite the lower housing assembly;
   the membrane button being peripherally positioned between the attachment mount and the sleeve mount of the upper housing assembly;
   the membrane button being coincident with the battery control unit;
   the tapered base being positioned between the alignment shaft and the membrane button;
   the contact mount being positioned within the alignment shaft; and
   the plurality of threaded attachment points being positioned on the tapered base and the alignment shaft.

3. The spring loaded rechargeable battery assembly as claimed in claim 2 comprises:
   the plurality of threaded attachment points comprises a first threaded attachment point and a second threaded attachment point;
   the first threaded attachment point being circumscribed by the alignment shaft; and
   the second threaded attachment point being perimetrically positioned on the tapered base.

4. The spring loaded rechargeable battery assembly as claimed in claim 1 comprises:
   the contact mount being traversed in part by the retractable contact assembly;
   the insulated mount being securely coupled to the contact mount;
   the pin assembly shaft traverses the contact mount;
   the contact pin assembly being retractably positioned within the pin assembly shaft;
   the spring loaded shaft being positioned between the contact plate and the contact terminal;
   the contact plate being securely coupled to the spring loaded shaft;
   the contact terminal partly traverses the pin assembly shaft;
   the contact terminal being sleeved by the spring loaded shaft;
   the contact plate being elastically retained against the contact terminal by way of the spring loaded shaft; and
   the contact terminal being electrically coupled to the battery control unit.

5. The spring loaded rechargeable battery assembly as claimed in claim 1 comprises:
   the battery cell being positioned between the battery control unit and the lower housing assembly;
   the battery control unit being encircled by the housing sleeve and the upper housing assembly;
   the upper battery mount being positioned between activator switch and the battery cell;
   the upper battery mount being electrically coupled to the battery cell;
   the activator switch being positioned collinear with the membrane button, wherein the collinear positioning provides the membrane with an actuatable alignment with the activator switch;
   the indicator light of the activator switch being oriented towards the membrane button; and
   the at least one terminal coupler being electrically engaged to the contact terminal.

6. The spring loaded rechargeable battery assembly as claimed in claim 1 comprises:
   the housing sleeve being securely engaged between the sleeve mount of the upper housing assembly and the sleeve mount of the lower housing assembly;
   the battery cell being surrounded by the housing sleeve;
   the lower battery mount being encircled by the housing sleeve;

the indicator light of the lower housing assembly is electrically coupled to the battery cell; and the indicator light of the lower housing assembly being positioned between the lower battery mount and the sleeve mount of the lower housing assembly.

7. A spring loaded rechargeable battery assembly comprises:
an upper housing assembly;
a retractable contact assembly;
a battery control unit;
a rechargeable battery cell;
a housing sleeve;
a lower housing assembly;
the upper housing assembly comprises a contact mount, an attachment mount, a membrane button, and a sleeve mount, wherein the membrane button is constructed of a translucent material;
the retractable contact assembly comprises an insulated mount and a contact pin assembly;
the battery control unit comprises an upper battery mount, a least one terminal coupler, and an activator switch;
the lower housing assembly comprises a sleeve mount, a lower battery mount, and an indicator light, wherein the sleeve mount of the lower housing assembly is constructed of a translucent material;
the attachment mount comprises an alignment shaft, a tapered base, and a plurality of threaded attachment points;
the insulated mount comprises a pin assembly shaft;
the contact pin assembly comprises a contact plate, an spring loaded shaft, and a contact terminal;
the activator switch comprises an indicator light;
the plurality of threaded attachment points comprises a first threaded attachment point and a second threaded attachment point;
the upper housing assembly, the retractable contact assembly, the battery control unit, the battery cell, the housing sleeve, and the lower housing being aligned collinear to each other;
the battery control unit, the battery cell, and the housing sleeve being positioned between the upper housing assembly and the lower housing assembly;
the battery control unit being electrically engaged with the upper housing assembly, the retractable pin assembly, the lower housing assembly, and the battery cell;
the sleeve mount of the upper housing assembly being securely coupled to the battery sleeve opposite the lower housing assembly;
the membrane button being peripherally positioned between the attachment mount and the sleeve mount of the upper housing assembly;
the membrane button being coincident with the battery control unit;
the tapered base being positioned between the alignment shaft and the membrane button;
the contact mount being positioned within the alignment shaft;
the plurality of threaded attachment points being positioned on the tapered base and the alignment shaft;
the first threaded attachment point being circumscribed by the alignment shaft; and
the second threaded attachment point being perimetrically positioned on the tapered base.

8. The spring loaded rechargeable battery assembly as claimed in claim 7 comprises:
the contact mount being traversed in part by the retractable contact assembly;
the insulated mount being securely coupled to the contact mount;
the pin assembly shaft traverses the contact mount;
the contact pin assembly being retractably positioned within the pin assembly shaft;
the spring loaded shaft being positioned between the contact plate and the contact terminal;
the contact plate being securely coupled to the spring loaded shaft;
the contact terminal partly traverses the pin assembly shaft;
the contact terminal being sleeved by the spring loaded shaft;
the contact plate being elastically retained against the contact terminal by way of the spring loaded shaft; and
the contact terminal being electrically coupled to the battery control unit.

9. The spring loaded rechargeable battery assembly as claimed in claim 7 comprises:
the battery cell being positioned between the battery control unit and the lower housing assembly;
the battery control unit being encircled by the housing sleeve and the upper housing assembly;
the upper battery mount being positioned between activator switch and the battery cell;
the upper battery mount being electrically coupled to the battery cell;
the activator switch being positioned collinear with the membrane button, wherein the collinear positioning provides the membrane with an actuatable alignment with the activator switch;
the indicator light of the activator switch being oriented towards the membrane button; and
the at least one terminal coupler being electrically engaged to the contact terminal.

10. The spring loaded rechargeable battery assembly as claimed in claim 7 comprises:
the housing sleeve being securely engaged between the sleeve mount of the upper housing assembly and the sleeve mount of the lower housing assembly;
the battery cell being surrounded by the housing sleeve;
the lower battery mount being encircled by the housing sleeve;
the indicator light of the lower housing assembly is electrically coupled to the battery cell; and
the indicator light of the lower housing assembly being positioned between the lower battery mount and the sleeve mount of the lower housing assembly.

11. A spring loaded rechargeable battery assembly comprises:
an upper housing assembly;
a retractable contact assembly;
a battery control unit;
a rechargeable battery cell;
a housing sleeve;
a lower housing assembly;
the upper housing assembly comprises a contact mount, an attachment mount, a membrane button, and a sleeve mount, wherein the membrane button is constructed of a translucent material;
the retractable contact assembly comprises an insulated mount and a contact pin assembly;
the battery control unit comprises an upper battery mount, a least one terminal coupler, and an activator switch;
the lower housing assembly comprises a sleeve mount, a lower battery mount, and an indicator light, wherein the sleeve mount of the lower housing assembly is constructed of a translucent material;

the attachment mount comprises an alignment shaft, a tapered base, and a plurality of threaded attachment points;
the insulated mount comprises a pin assembly shaft;
the contact pin assembly comprises a contact plate, an spring loaded shaft, and a contact terminal;
the activator switch comprises an indicator light;
the plurality of threaded attachment points comprises a first threaded attachment point and a second threaded attachment point;
the upper housing assembly, the retractable contact assembly, the battery control unit, the battery cell, the housing sleeve, and the lower housing being aligned collinear to each other;
the battery control unit, the battery cell, and the housing sleeve being positioned between the upper housing assembly and the lower housing assembly;
the battery control unit being electrically engaged with the upper housing assembly, the retractable pin assembly, the lower housing assembly, and the battery cell;
the sleeve mount of the upper housing assembly being securely coupled to the battery sleeve opposite the lower housing assembly;
the membrane button being peripherally positioned between the attachment mount and the sleeve mount of the upper housing assembly;
the membrane button being coincident with the battery control unit;
the tapered base being positioned between the alignment shaft and the membrane button;
the contact mount being positioned within the alignment shaft;
the plurality of threaded attachment points being positioned on the tapered base and the alignment shaft;
the first threaded attachment point being circumscribed by the alignment shaft;
the second threaded attachment point being perimetrically positioned on the tapered base;
the contact mount being traversed in part by the retractable contact assembly;
the insulated mount being securely coupled to the contact mount;
the pin assembly shaft traverses the contact mount;
the contact pin assembly being retractably positioned within the pin assembly shaft;
the spring loaded shaft being positioned between the contact plate and the contact terminal;
the contact plate being securely coupled to the spring loaded shaft;
the contact terminal partly traverses the pin assembly shaft;
the contact terminal being sleeved by the spring loaded shaft;
the contact plate being elastically retained against the contact terminal by way of the spring loaded shaft;
the contact terminal being electrically coupled to the battery control unit;
the battery cell being positioned between the battery control unit and the lower housing assembly;
the battery control unit being encircled by the housing sleeve and the upper housing assembly;
the upper battery mount being positioned between activator switch and the battery cell;
the upper battery mount being electrically coupled to the battery cell;
the activator switch being positioned collinear with the membrane button, wherein the collinear positioning provides the membrane with an actuatable alignment with the activator switch;
the indicator light of the activator switch being oriented towards the membrane button;
the at least one terminal coupler being electrically engaged to the contact terminal;
the housing sleeve being securely engaged between the sleeve mount of the upper housing assembly and the sleeve mount of the lower housing assembly;
the battery cell being surrounded by the housing sleeve;
the lower battery mount being encircled by the housing sleeve;
the indicator light of the lower housing assembly is electrically coupled to the battery cell; and
the indicator light of the lower housing assembly being positioned between the lower battery mount and the sleeve mount of the lower housing assembly.

* * * * *